[11] 3,526,219

[72] Inventor Lewis Balamuth
   New York, New York
[21] Appl. No. 655,118
[22] Filed July 21, 1967
[45] Patented Sept. 1, 1970
[73] Assignee Ultrasonic Systems, Inc.
   Farmingdale, New York
   a corporation of Delaware

[54] METHOD AND APPARATUS FOR ULTRASONICALLY REMOVING TISSUE FROM A BIOLOGICAL ORGANISM
28 Claims, 10 Drawing Figs.
[52] U.S. Cl. .................................................. 128/2,
   30/123.3, 30/272, 32/58, 128/305, 175/56, 225/1, 299/14
[51] Int. Cl. .................................................. A61b 17/32
[50] Field of Search ....................................... 128/2, 2B,
   24.05, 303, 303.14, 305, 310/26 (Cursory);
   51/(Ultra. Digest); 32/28, 46, 58; 30/123.3,
   133, 272; 83/(Inquiry); 175/56, (Digest);
   128/2, 2B, 305; 30/272; 175/56; 252/1;
   299/14

[56] References Cited
UNITED STATES PATENTS
| | | | |
|---|---|---|---|
| 1,966,446 | 7/1934 | Hayes | 310/26 |
| 2,442,033 | 5/1948 | Brantly et al. | 32/28 |
| 2,580,716 | 1/1952 | Balamuth | 128/24.05UX |
| 2,874,470 | 2/1959 | Richards | 128/24.05X |
| 2,921,372 | 1/1960 | Bodine | 32/27 |
| 2,990,616 | 7/1961 | Balamuth et al. | 32/26 |
| 3,086,288 | 4/1963 | Balamuth et al. | 30/272 |
| 3,133,351 | 5/1964 | Von Seggern | 32/26 |
| 3,213,537 | 10/1965 | Balamuth et al. | 32/28 |
| 3,368,280 | 2/1968 | Friedman et al. | 32/58 |
| 3,375,583 | 4/1968 | Blank et al. | 32/26 |

*Primary Examiner*—Richard A. Gaudet
*Assistant Examiner*—Kyle L. Howell
*Attorney*—Leonard W. Suroff ABSTRACT: A method and apparatus for the removal of layers of relatively high compliant material, such as tissue from biological organisms in humans, by means of hyper-accelerations of vibratory forces in the ultrasonic frequency range without causing any disruption or damage to the underlying layers of material. The ultrasonic vibratory energy is applied by a tool member having a fine edge that is vibrated at accelerations of at least 50,000g with means to control the depth of penetration of the tool into the surface as well as providing a treatment liquid to maintain the surface at a temperature below which permanent damage would occur to the surrounding tissue. Means are also provided for continuously removing the micro-chopped tissue from the surface after treatment.

Patented Sept. 1, 1970
3,526,219
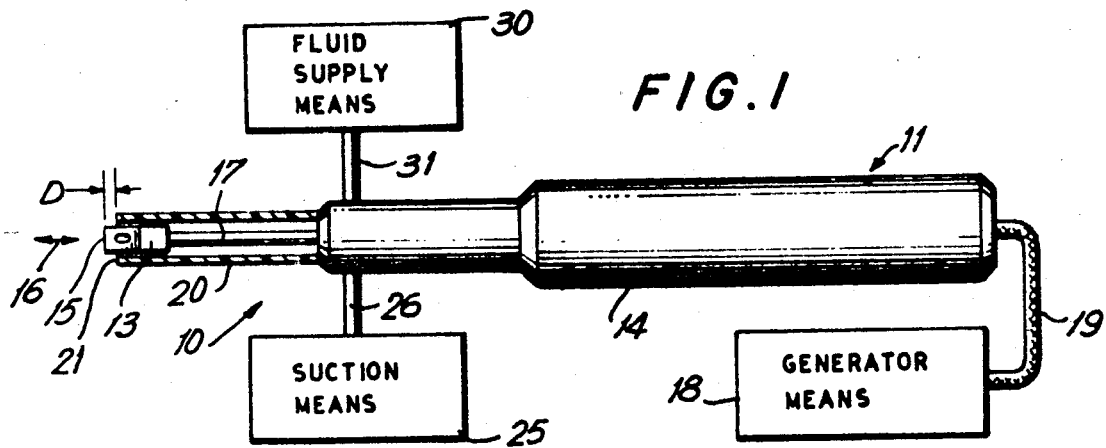
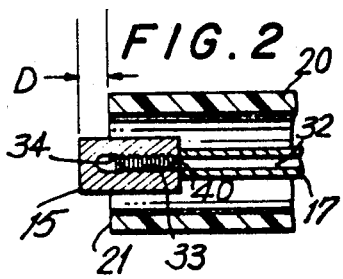
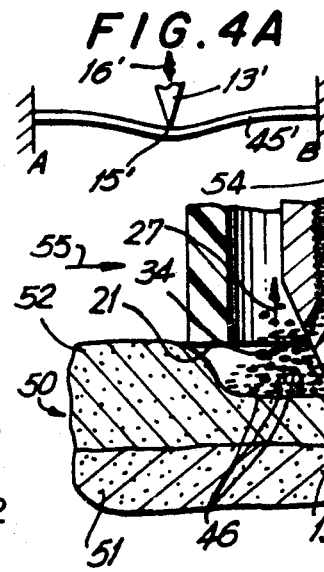
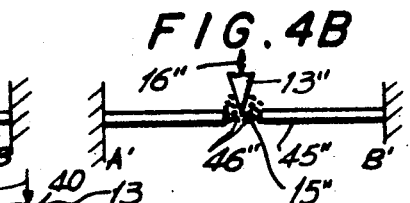
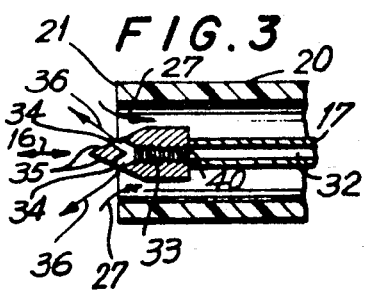
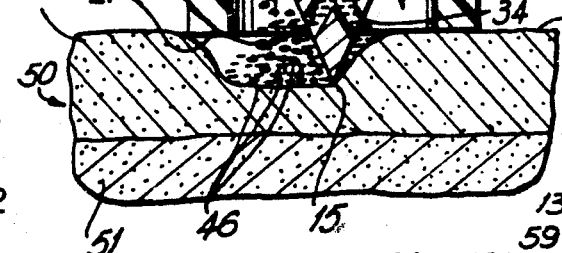
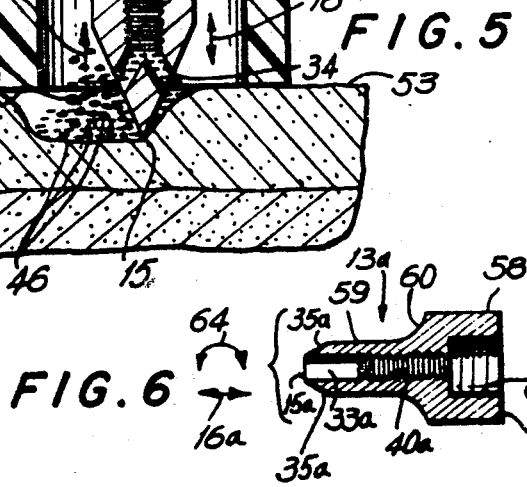
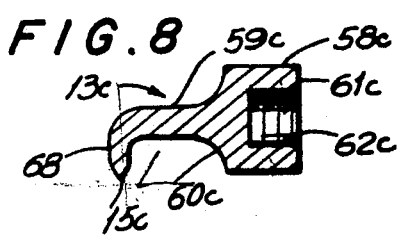
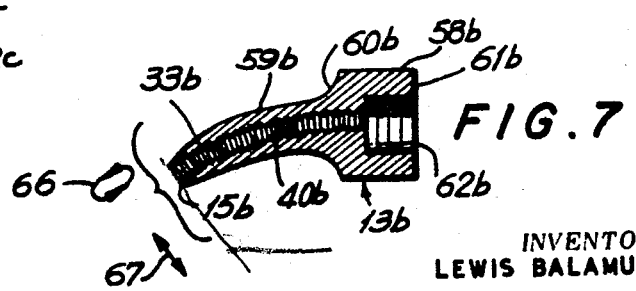
INVENTOR.
LEWIS BALAMUTH
BY
Leonard W. Suott
ATTORNEY 3,526,219

METHOD AND APPARATUS FOR ULTRASONICALLY REMOVING TISSUE FROM A BIOLOGICAL ORGANISM

BACKGROUND OF THE INVENTION

This invention relates broadly to the therapeutic treatment of biological organisms by the selective removal therefrom of tissue formations with ultrasonic vibrational forces and more particularly to methods and apparatus for "micro-chopping" and removing layers of living organic tissue, most notably in humans, with a tool member vibrated at hyper-acceleration forces.

Although the principles of the present invention are broadly applicable to the removal of layers of high compliant materials the present invention is particularly adapted for use in conjunction with organic tissue in humans, such as found in tumors, warts, moles, skin cancer, normal healthy tissue, tissues such as are found on the tongue, eye, in the ear, adenoids, tonsils, etc., and hence will be so illustrated and will be so described.

OBJECTIVES OF THE INVENTION

An object of the present invention is to provide an improved method and apparatus for progressively removing layers of high compliant material from a body of the same material.

Another object of the present invention is to provide an improved method and apparatus for micro-chopping and removing tissue from a biological organism.

Yet another object of the present invention is to provide a variety of specially designed tools adapted to remove layers of organic tissue from a biological organism.

A further object of the present invention is to provide a method and apparatus for micro-chopping and removing a layer of tissue without causing any damage to the surrounding tissue.

Yet another object of the present invention is to provide a method for the removal of living organic tissue in a rapid manner and with the exertion of a minimum of physical energy by the person effecting such removal.

Still another object of the present invention is to provide a method and apparatus for selectively disintegrating and removing layers of living organic tissue from a biological organism.

Other objects and advantages of this invention will become apparent as the disclosure proceeds.

SUMMARY OF THE INVENTION

The outstanding and unexpected results obtained by the practice of the method and apparatus of this invention are attained by a series of features, steps and elements assembled working together in inter-related combination.

Briefly the applicant has now discovered that mechanical elastic vibrations of hyper-accelerations of 50,000g, properly transmitted to a biological organism in vivo may be employed to selectively separate living organic tissue from surrounding tissue without harmful effects to the surrounding tissue. This new principle has been termed "micro-chopping" to more clearly define and illustrate the invention and the theory of which is hereinafter disclosed in detail.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a side elevational view, partly broken away and in section, of an ultrasonic system in accordance with the present invention;

FIG. 2 is an enlarged view in section of the ultrasonic tool and associated guard as illustrated in FIG. 1;

FIG. 3 is a side elevational view in section of the ultrasonic tool and associated guard illustrated in FIG. 2;

FIGS. 4A and 4B are diagrammatic views to illustrate the theory of the present invention;

FIG. 5 is a greatly enlarged section of a portion of the human anatomy illustrating the micro-chopping and removal of a layer of tissue, in accordance with the invention;

FIG. 6 is a detail view of another tool that can be used in accordance with the invention;

FIG. 7 is a view similar to that of FIG. 6, but showing another form of tool;

FIG. 8 is a view similar to that of FIG. 6, but showing another form of tool; and FIG. 9 shows a portion of a tool having a needle shaped edge.

Referring to the drawings in detail and initially to FIGS. 1, 2 and 3 thereof, it will be seen that an apparatus 10 for ultrasonically removing tissue from a biological organism, may include an ultrasonic motor 11 for effecting the necessary high frequency vibrations of the tool 13 having a sharp output edge or surface 15. The ultrasonic motor 11 may be in the form of a hand piece adapted for being hand held and generally comprising a tubular housing 14 into which an insert unit 17 supporting the tool 13 may be partially telescoped. The ultrasonic motor 11 is energized by an oscillation generator 18, with a power cable 19, connecting the two together. The generator is an oscillator adapted to produce electrical energy having an ultrasonic frequency.

The ultrasonic motor 11 may be one of a variety of electromechanical types, such as electrodynamic, piezoelectric and magnetostrictive. The ultrasonic motor for effecting tissue removal through hand directed tools of suitable configuration which are inter-changeable with other work performing tools in acoustically vibrated material treating devices may be of the type disclosed in U.S. Pats. Re. 25,033, 3,075,288, 3,076,-904 and 3,213,537, and wherein each work tool is rigidly joined, in end-to-end relationship to a connecting body or acoustic impedance transformer and to a transducer which may form an insert unit or assembly which is removably supported in a housing containing a coil in surrounding relationship to the transducer and receiving alternating current for producing an alternating electromagnetic field.

The transducer in the ultrasonic motor 11 is longitudinally dimensioned so as to have lengths which are whole multiples of half-wavelengths of the compressional waves established therein at the frequency of the biased alternating current supplied so that longitudinal loops of motion as indicated by arrow 16, occur both at the end of the insert unit 17 to which the tool 13 is rigidly connected. Thus, the optimum amplitude of longitudinal vibration and hyper-accelerations of tool 13 is achieved, and such amplitude is determined by the relationship of the masses of the tool 13 and insert unit 17 which may be made effective to either magnify or reduce the amplitude of the vibrations received from the transducer.

The tool 13 may be in the form of relatively flat metal member, as shown in FIGS. 1, 2, and 3, thereby to provide relatively wide surface areas for contact with the tissue or other highly compliant materials to which the vibrations are to be applied for effecting the removal thereof by micro-chopping. The tool 13 may be permanently attached to the end of insert unit 17, for example, by brazing solder or the like, or the tool may be provided with a threaded stud (not shown) adapted to be screwed into a tapped hole in the end of insert unit 17 for effecting the rigid connection of the tool to the stem.

Guard means in the form of hood 20, extending from the casing 14 is provided in telescoping relationship to the insert unit 17 and tool member 13 with its front end 21 in spaced relation a distance D to the edge 15 of the tool 13. As hereinafter explained in detail this permits the user to control the thickness of the layer of tissue to be micro-chopped into small segments and removed.

In order to facilitate the removal of the micro-chopped tissue from the work site suction means 25 connected by means of conduit 26 to the ultrasonic motor 11 is provided. The conduit 26 is connected in any conventional manner (not shown) through the housing 14 and terminating in the hood 20 so as to apply a suction force as indicated by the arrow 27 in FIG. 3. The suction means 25 may be in the form of any conventional suction equipment well known.

In order to facilitate the removal of the micro-chopped tissue and relative movement between the tool and tissue a liquid supply 30 connected by conduit 31 to the ultrasonic motor 11 is provided and may be supplied to the work site by providing a bore 32 within the insert unit 17 and connected to the conduit 31 by means not shown. The tool 13 contains a channel 33 communicating with the bore 32. The channel 33 merges into branches 34 which terminate in the upwardly and outwardly tapered side walls 35 of the tool and through which the fluid flows as in the direction of arrow 36.

Ultrasonic pumping means 40 may be relied upon either alone or in combination with the suction means 25 to remove the micro-chopped material from the work site. The pumping means 40 is employed when the channel 33, and branches 34 are utilized as the removal duct and said ultrasonic pumping means may consist of formations on the wall of the channel 33 as for example, threads which direct the micro-chopped particles away from the work site to permit a debris free surface.

PROPOSED THEORY OF PRESENT INVENTION

Whereas a scientific explanation of the theory based on observation of the phenomena involved is disclosed below, it is to be clearly understood that the invention is by no means limited by any such scientific explanation.

Applicant has now discovered that a tool having a sharp edge, vibrating ultrasonically, and gently pressed against a highly compliant substance, such as organic living tissue, will actually penetrate or shatter said substance whenever the peak acceleration of the sharp edge is above the threshold range of the treated material. For example, as illustrated in FIG. 4A, consider an elastic thread 45' suspended between fixed points A and B against which a vibrating tool 13', having an edge 15', is gently pressed. If the peak acceleration of the tool edge 15', as illustrated by the arrow 16', is below the threshold range referred to above, the tool edge 15' merely bends the elastic thread as shown in FIG. 4A. All this is happening during a single oscillation of the vibrating edge 15'.

As illustrated in FIG. 4B for a similar elastic thread 46" suspended between fixed points A and B, however, if the peak acceleration is above said threshold, a dramatically new phenomenon occurs, namely the thread 45", during the downward blow of the edge 15" of the tool 13" shatters or breaks during said contact into a plurality of particles 46".

It has been shown that this threshold will vary for materials of differing compliancies. For example, in the presence of a treatment fluid and a hard material of very low compliance we get the well known phenomenon of ultrasonic impact grinding. But, for substances such as human tissue it is found that if one uses a tool edge where the peak acceleration is well over the value of 50,000g, then this new and remarkable threshold phenomenon occurs, permitting rapid removal of tissue in a completely new and novel way. By simultaneously employing gross motion of the vibratory tool along a plane substantially parallel to the surface of the very highly compliant material we obtain a repetition of the dramatic phenomenon which applicant has defined as "micro-chopping" so that layers of material may be removed.

To further explain the nature of the phenomenon herein involved, reference is made to the fact that high speed photography has shown that water when struck by a high speed object undergoes, in the initial microseconds, a kind of shattering, as if the surface were a pane of glass. Thus, we see the possibility of a principle which asserts that a fluid-like or highly compliant medium which is ordinarily easily flexible and penetrable in the presence of ordinary motions, may behave like a brittle solid at sufficiently high accelerations. In contrast thereto solid bodies, in the presence of tools striking at suitable speeds of accelerations behave more like a fluid and permit ready penetration of the tool therein, as illustrated in U.S. Pat. No. 3,184,353.

Applicant is well aware of the art of disrupting biological cells by means of intensely cavitating liquids such as is obtained by putting such cells in a liquid suspension and then irradiating the liquid with a beam of ultrasonic vibration strong enough to produce vigorous cavitation. In this way blood cells may be hemolyzed in a very short time by means of cavitating liquid. But, if one takes the cells in the skin of one's finger and exposes them indefinitely by rubbing the finger tip against an ultrasonic tool of flat piston-like output in the presence of a liquid, one will experience a tingling, massage-like sensation, which is not unpleasant and all that happens superficially is the cleaning of the surface of the skin. Thus, those forces which will disrupt cells in liquid suspension will have no such effect on live tissue such as human skin. But, as soon as a tool vibrating at hyper-intense accelerations whose output configuration is in accord with the teachings herein is brought into direct contact with the tissue, the interaction between the tool and the tissue causes the said tissue to be chopped or broken into small sections and easily removed without damage to the underlying tissue.

The kind of breakdown herein disclosed is quite different from slicing tissue, as with a surgical knife which is ultrasonically vibrated and described in U.S. Pat. No. 3,086,288. The surgical knife effect is essentially one of reduced friction during cutting, together with reduced force required to perform the cutting operation. Except for such ultrasonically induced effects, the knife cuts as an ordinary scalpel cuts.

The theory of the application with respect to the present invention is illustrated in FIG. 5 which contains a portion 51 of a biological organism 50 such as a human anatomy, having an outer layer of tissue 52 of which we desire to remove a discrete layer therefrom.

The hand held ultrasonic motor illustrated in FIG. 1 is employed and the tool 13 moves periodically in a plane substantially normal to the layer 52 in the direction of arrow 55, so that its peak acceleration is well above 50,000g., and which tool, when applied to the superficial biological tissue 52, will actually disintegrate same into small particles or sections 46 by way of the micro-chopping action present. In the presence of a treatment fluid which is generally a liquid provided through channel 33 and branches 34 from the fluid supply the small particles of tissue 46 so removed, will be homogenized and emulsified forming a suspension thereof and thus rendered sufficiently fluid for ready removal by pumping or suction through relatively small conduits.

As seen in FIG. 5 the homogenized material is removed in the direction of arrow 27 which is within a conduit formed between the inner diameter of the guard 20 and outer surface of tool 13 and insert 17. In practicing the invention a light static force in the direction of arrow 54 permits the output edge 15 of tool 13 to shatter the outer surface 53 of the tissue 52 while the tool is vibrating with peak accelerations of at least 50,000g. The tool 13 then immediately sinks into the tissue 52, a preselected amount which is the distance between the front end 21 of the guard means 20 and tool edge 15. The guard 20 also serves the dual function of permitting the user of the instrument to grip and hold it as close to the vibratory surface as possible and control the thickness of skin removed. Depending upon the nature and location of the tissue to be removed the guard if desired may be adjusted by means not shown so that the controlled spacing is less than the thickness of the total layer to be removed. The guard is preferably made of a plastic material so as not to transmit the ultrasonic vibrations to the tissue.

To progressively cover a surface area and remove a layer of the organic tissue therefrom the ultrasonic motor is moved in the direction of arrow 55 so as to continually micro-chop the surface area and apply a suction force and a treatment fluid to the work site. The treatment fluid is preferably an antiseptic so that the surface may be maintained free of germs. The treatment liquid is pressurized by the tool 13 which enhances the effectiveness of the liquid in mixing with the micro-chopped tissue and forming a suspension thereof. The suspension may flow by means of gravity from the treated surface or a suction force may be applied and utilized adjacent the tool.

If desired the flow may be reversed and the liquid supplied by the pumping means through the opening defined between the inner surface of the guard means 20 and the tool 13 so as to permit the removal of the emulsified mixture through at least one of the branches 34 and channel 33. The suction means illustrated in FIG. 1 may be employed and may be assisted by the ultrasonic pumping means 40 contained in the tool 13. The pumping means consisting of a number of ridges as in the form of threads actually apply a force in the direction of arrow 16 which force assists in instantaneously cleaning the work site. As such the continuous removal of the micro-chopped tissue from the surface may also be accomplished by combining the ultrasonic pumping action with the suction supplied through the tool.

ADDITIONAL FORMS OF THE INVENTION

In removing a wart or a mole one may employ a hand held instrument as illustrated in FIGS. 1, 2 and 3 wherein the active tool output surface enjoys transverse vibration, compressional vibration, flexural vibrations or torsional vibrations or even combinations of said vibrations. For instance, torsional and compressional vibration combined, produce a kind of "corkscrew" vibratory motion, which is particularly suitable for obtaining small tissue samples for biopsy purposes.

FIGS. 6 through 9 illustrate other forms of tools that may be used to obtain the variety of vibrational motions for the removal of tissue in various locations in accordance with the present invention.

The edges of the tools illustrated herein may be chisel-shaped, (FIGS. 1 and 8) needle point (FIG. 9) or hollow tube (FIGS. 6 and 7) depending on the surgical use contemplated. Also the vibrations of said tip may be axial with the tool output end axis, or it may be transverse to said axis. In addition "corkscrew vibration" may be produced by a multifrequency handpiece which combines resonant torsional and longitudinal vibration in a tool tip. In some cases, it is useful to use elliptical vibrations such as can be produced by combining longitudinal and flexural waves in the tool tips.

The tool 13a illustrated in FIG. 6 has an enlarged end 58, a smaller front end 59, and a blending radius 60 therebetween and is designed to increase the amplitude of vibration when it is connected at its rear end 61 by means of a threaded portion 62 to the insert unit of the ultrasonic motor.

A through channel 33a is provided from the tip 15a to the rear end 61 and which may contain an ultrasonic pumping arrangement in the form of threads, extending partially or continually through the tool. The tool 13a is preferably of a cylindrical cross-section and as all the tools illustrated preferably made of a metallic material. The tool 13a when coupled to the properly matched ultrasonic motor may be longitudinally vibrated as indicated by arrow 16a or torsionally and longitudinally vibrated to obtain a corkscrew type high frequency vibratory motion at the tool edge 15a. If desired the fluid may be supplied through the channel 33a even though it contains the pumping means 40a.

If one takes the longitudinally vibrating tip 13a in a handpiece vibrating at 25,000 c.p.s. in the form of a hollow tube with a sharpened edge 15b and is vibrating same with a vibratory stroke of .004", and applies it to a small scab on a skin wound, the scab will literally disintegrate or disappear before one's very eyes. If liquid is supplied during the operation, the scab material will be dispersed in the liquid, and with ultrasonic pumping means 40a or such pumping aided by auxiliary suction equipment, will keep the operating site clear of disintegrated tissue. Now a tool vibrating longitudinally (compressional waves in handpiece) with a stroke of .004" will yield a peak acceleration of 125,000g. In order to sustain high stroke vibration in the hyper-acceleration level, metal alloy must be used which has the requisite endurance limits. Titanium as furnished commercially, has been found to be eminently suited to this application. In fact, with titanium it is possible to go to vibratory strokes (at 25,000 c.p.s.) considerably larger than .004". This increased the range or potential of applicant's "tissue nibbling" tool for use in the micro-chopping process.

FIG. 7 illustrates another form of tool tip 13b having an enlarged end 58b, a smaller angularly bent forward portion 59b and a blending radius 60b therebetween. The threaded portion 62b extending inwardly from the rear end 61b permits the tool 13b to be secured to the ultrasonic motor. The hollow tubular channel 33b extends from the sharp edge 15b and terminates at the threaded portion 62b. In this form the ultrasonic pumping means 40b extends the entire length of the channel 33b and the particles of tissue may be continuously removed from the work site to permit continuous visual inspection thereof. The vibratory hyper-acceleration motion at the sharpened edge 15b may be of an elliptical form as indicated by the arrow 66 or transverse in a plane substantially normal to the edge 15b as indicated by arrow 67.

FIG. 8 illustrates a form of tool 13c having an enlarged end 58c merging with a small end 59c by means of radius 60c. The tool is coupled by means of the threaded portion 62c extending into the tool from the rear end 61c. A finger 68 is integrally formed with and extends at substantially right angles to the forward end 59c with the edge 15c thereof formed like a chisel which extends in a transverse plane to the direction of the threaded portion 62c.

FIG. 9 shows a form of tool in which the finger is annular in cross-section and terminates in a needle point 15d.

The tools illustrated in FIGS. 8 and 9 may be provided with a central chamber to accommodate either a liquid supply or suction to remove the micro-chopped tissue from the work site. In like fashion the tools illustrated in FIGS. 6 and 7 may be provided without the open channel extending therethrough. Although fluid supply means and suction means are provided the methods of the present invention of ultrasonically scraping and removing organic tissue may be conducted "dry" without providing a liquid such as water.

If a treatment fluid is used then an antiseptic solution is preferred so that the work site may remain not only free of micro-chopped tissue but sterile at the same time. The liquid is supplied to "float away" the removed tissue and also maintain the work site at a controlled temperature as not to overheat the surrounding tissue and possibly cause permanent damage thereof. The necessity of cooling the work site will be directly related to the type of tissue being removed. An additional factor to be considered is the size of the surface area and thickness of the layer to successive layers to be removed. If desired the treatment fluid may be supplied at a preselected temperature just for this purpose.

In contrast the suction forces may be employed although the micro-chopping process is being carried on dry.

Although the previously described embodiments of the invention have all involved the removal of tissue from organic structures, it is apparent that the method embodying the invention may be employed for removing any other material of relatively low compliance, by introducing elastic vibrations above the determined threshold thereof which will generally exceed 50,000g.

Although illustrative embodiments of the invention have been described in detail herein with reference to the accompanying drawing, it is to be understood that the invention is not limited to those precise embodiments, and that various changes and modifications may be effected therein without departing from the scope or spirit of the invention, except as defined in the appended claims.

I Claim:
1. A method of removing a layer of material from a surface of a relatively high compliant body, having a threshold range at which the surface material of the body will be separated by a chopping action, comprising the steps of:
   a. vibrating a tool member having a fine output edge so as to provide peak accelerations of at least 50,000g, and above the threshold range of the relatively high compliant body;
   b. engaging said output edge of said vibrating tool member with the surface of said compliant body to transmit said vibrations to the material in engagement therewith, said vibrations having a substantial component of motion in a plane substantially parallel to the longitudinal axis of the tool and substantially normal to said fine output edge; and
   c. micro-chopping said material from said compliant body by progressively moving said output edge relative to the surface of said compliant material such that there is a substantial component of relative motion substantially parallel to the surface of said compliant material and perpendicular to said edge, whereby a layer of material from said relatively high compliant body is removed.

2. A method of removing a layer of tissue from a relatively high compliant surface of a biological organism, said surface having a threshold range at which the surface material of the organism will be separated by a chopping action, comprising the steps of:
   a. vibrating a tool member having a fine output edge to provide peak accelerations of at least 50,000g, and above the threshold range of the relatively high compliant body;
   b. engaging said output edge of said vibrating tool member with the surface of said tissue to transmit said vibrations to the tissue in engagement therewith, said vibrations having a substantial component of motion in a plane substantially parallel to the longitudinal axis of the tool and substantially normal to said fine output edge; and
   c. micro-chopping said tissue from said biological organism by progressively moving said output edge relative to the surface of said tissue such that there is a substantial component of relative motion substantially parallel to the surface of said tissue and perpendicular to said edge, whereby a layer of said tissue is removed from said biological organism.

3. A method as in claim 2, further including the step of continuously supplying a treatment fluid to the surface adjacent said vibrating tool member to facilitate the relative movement between said vibrating tool member and surface layer of tissue.

4. A method as in claim 3, wherein said treatment liquid is an antiseptic to maintain the surface in a sterilized condition.

5. A method as in claim 2, wherein said tissue removed is of the same biological structure as the surrounding tissue.

6. A method as in claim 2, further including the step of controlling the depth of removal of said layer of tissue during the relative movement between said biological organism and tool member.

7. A method as in claim 6, wherein said thickness of tissue removed is controlled by providing a guard having a bottom end in substantially parallel spaced relation to the output edge of said tool member, whereby the thickness of the layer of tissue to be removed is controlled.

8. A method as in claim 2, wherein said output edge of the tool member is simultaneously vibrated in a direction transversely of the longitudinal axis of the tool, substantially parallel to the direction of relative motion between said tool member and tissue surface.

9. A method as in claim 2, wherein said output edge of said tool member is elliptically vibrated.

10. A method as in claim 2, wherein said output edge of said tool member is torsionally vibrated.

11. A method as in claim 2, wherein said output edge is vibrated with simultaneous longitudinal and torsional vibration.

12. A method as in claim 2, wherein said tool output edge is vibrated in the range of at least 100,000 to 150,000g.

13. A method as in claim 2, further including the step of maintaining said surface at a temperature below which permanent damage would occur to the surrounding tissue, said temperature being maintained by supplying a treatment liquid at a preselected temperature.

14. A method as in claim 2, further including the step of continuously removing the micro-chopped tissue from the surface after treatment.

15. A method as in claim 14, wherein said removal of tissue is obtained by applying suction to the treated surface adjacent the output edge of the vibrating tool member.

16. A method as in claim 14, wherein said micro-chopped tissue is removed by:
   a. supplying a treatment liquid to the treated surface so that contact of said output edge with the treated surface pressurizes the liquid for enhancing the effectiveness of the liquid in mixing with the micro-chopped tissue and forming a suspension thereof; and
   b. simultaneously applying suction to said treated surface adjacent said tool member to remove said suspension from the surface.

17. A method as in claim 16, wherein the treatment liquid is supplied to the tissue surface and the suction is applied to the tissue surface at spaced apart locations between which at least a portion of the vibrated tool member is interposed so that the suction induces the treatment liquid to flow between said vibrated tool member and the tissue surface for ensuring the continuous mixing and the removal of said suspension.

18. A method as in claim 17, wherein the treatment liquid is supplied at the center of said vibrated tool member and the suction is applied at the periphery of the vibrated tool member.

19. A method as in claim 17, wherein the suction is applied at the center of said vibrated tool member and the treatment liquid is supplied at the periphery of the vibrated tool member.

20. A method of micro-chopping a layer of tissue from a relatively high compliant surface of a biological organism, comprising the steps of:
   a. vibrating a tool member having a fine output edge to provide peak accelerations of at least 50,000g;
   b. engaging said output edge of said vibrated tool member with the surface of said tissue to micro-chop the tissue in engagement therewith;
   c. moving said output edge relative to the surface of said tissue such that there is a substantial component of relative motion substantially parallel to the longitudinal axis of said tool and perpendicular to said edge, whereby a layer of said tissue is progressively micro-chopped from said biological organism; and
   d. continuously removing the micro-chopped tissue from the surface after treatment, said removal of tissue is obtained by ultrasonically pumping the disintegrated tissue through the vibrating tool member.

21. A method of micro-chopping a layer of tissue from a relatively high compliant surface of a biological organism, comprising the steps of:
   a. vibrating a tool member having a fine output edge to provide peak accelerations of at least 50,000g;
   b. engaging said output edge of said vibrated tool member with the surface of said tissue to micro-chop the tissue in engagement therewith;
   c. moving said output edge relative to the surface of said tissue such that there is a substantial component of relative motion substantially parallel to the longitudinal axis of said tool and perpendicular to said edge, whereby a layer of said tissue is progressively micro-chopped from said biological organism; and
   d. continuously removing the micro-chopped tissue from the surface after treatment, said tissue is removed from the surface by a combination of suction and ultrasonic pumping.

22. Apparatus for micro-chopping a layer of tissue from a relatively high compliant surface of a biological organism, comprising:
a. a tool member having a fine output edge for engagement with the layer of tissue of said biological organism as it is moved relative thereto;
b. vibration generating means coupled to said tool member to effect vibration of the latter at a high frequency and with peak accelerations of at least 50,000g, so as to micro-chop said tissue into particles as the vibrating tool is moved relative to said tissue surface;
c. a housing adapted to be hand held enclosing said vibration generating means coupled to said tool member with said tool member extending from one end of said housing;
d. guard means extending from said housing in telescoping relationship to said tool member to substantially expose only the output edge and defining an axial spacing therebetween;
e. means operatively associated with said housing for supplying a treatment fluid to the tissue surface adjacent said vibrated tool member so that contact of said vibrated tool member pressurizes the liquid for enhancing the effectiveness of the fluid in mixing with the micro-chopped tissue particles and forming a suspension thereof; and
f. means operatively associated with said housing for effecting continuous removal of said suspension from said tissue surface.

23. Apparatus as in claim 22, further comprising control means for controlling the thickness of said layer of tissue micro-chopped from the surface of the biological organism, said control means including said guard means extending from said housing having one end in parallel spaced relation to the output edge of said tool member, whereby said spacing limits the thickness of said layer of tissue removed.

24. Apparatus as in claim 22, wherein said treatment fluid is supplied to the tissue surface through said axial spacing between said guard means and said tool member.

25. Apparatus as in claim 22, wherein said suspension from said tissue surface is removed through said axial spacing between said guard means and said tool member.

26. Apparatus for micro-chopping a layer of tissue from a relatively high compliant surface of a biological organism, comprising:
a. a tool member having a fine output edge for engagement with the layer of tissue of said biological organism as it is moved relative thereto;
b. vibration generating means coupled to said tool member to effect vibration of the latter at a high frequency and with peak accelerations of at least 50,000g, so as to micro-chop said tissue into particles as the vibrating tool is moved relative to said tissue surface;
c. means operatively associated with said vibration generating means for supplying a treatment fluid to the tissue surface adjacent said vibrated tool member so that contact of said vibrated tool member pressurizes the liquid for enhancing the effectiveness of the fluid in mixing with the micro-chopped tissue particles and forming a suspension thereof; and
d. means operatively associated with said vibration generating means for effecting continuous removal of said suspension from said tissue surface, said means for effecting continuous removal of said suspension from said surface includes ultrasonic pumping means.

27. Apparatus as in claim 26, wherein said ultrasonic pumping means includes an open channel extending through said tool member from said output edge and having grooves therein which extend, at least in part, at substantial angles with respect to the directions of application of said tool member against said tissue so as to promote rapid removal of said micro-chopped particles from the surface.

28. Apparatus as in claim 27, wherein said continuous removal means further includes suction means communicating with said channel in said tool member, whereby the suspension is removed by the combined action of said pumping and suction means.